United States Patent
Tang

(10) Patent No.: US 6,512,063 B2
(45) Date of Patent: Jan. 28, 2003

(54) PROCESS FOR PRODUCING FLUOROELASTOMERS

(75) Inventor: Phan Linh Tang, West Chester, PA (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/908,265

(22) Filed: Jul. 18, 2001

(65) Prior Publication Data

US 2002/0040119 A1 Apr. 4, 2002

Related U.S. Application Data

(60) Provisional application No. 60/237,516, filed on Oct. 4, 2000.

(51) Int. Cl.[7] .................. C08F 214/18; C08F 214/22; C08F 214/26; C08F 212/02
(52) U.S. Cl. ................. 526/225; 526/247; 526/249; 526/250; 526/255
(58) Field of Search .................... 526/255, 250, 526/247, 249, 225

(56) References Cited

U.S. PATENT DOCUMENTS

| | | | |
|---|---|---|---|
| 4,130,523 A | * | 12/1978 | Hoy |
| 4,380,618 A | | 4/1983 | Khan et al. |
| 4,524,197 A | | 6/1985 | Khan |
| 5,216,065 A | * | 6/1993 | Colyer .................. 524/459 |
| 5,688,884 A | | 11/1997 | Baker et al. |
| 5,753,742 A | * | 5/1998 | Bumanlag .................. 524/501 |
| 5,854,364 A | * | 12/1998 | Senninger .................. 526/192 |

FOREIGN PATENT DOCUMENTS

| | | |
|---|---|---|
| EP | 0 685 499 A1 | 12/1995 |
| GB | 1 004 395 | 9/1965 |
| GB | 1 456 615 | 11/1976 |

OTHER PUBLICATIONS

G. Kostov, N. Khristova, AT. Atanasov, I. Petrov, AL. Nikolov, T. Ilneva, Emulsion Polymerization of Tetrafluoroethylene with Propylene, God. Vissh. Khim.–Tekhnol. Inst., Sofia (1984), vol. Date 1983, 29(2), 316–20, Bulgaria.

* cited by examiner

*Primary Examiner*—Fred Zitomer

(57) ABSTRACT

A novel emulsion polymerization process for the production of fluoroelastomers is disclosed wherein a hydrocarbon sulfonate anionic surfactant of the formula $CH_3$—$(CH_2)_n$—$SO_3M$, $CH_3$—$(CH_2)_n$—$C_6H_4$—$SO_3M$, or $CH_3$—$(CH_2)_n$—$CH$=$CHCH_2$—$SO_3M$, where n is an integer from 6 to 17, or mixtures thereof, and M is a cation having a valence of 1, is used as the dispersing agent.

44 Claims, No Drawings

PROCESS FOR PRODUCING FLUOROELASTOMERS

CROSS-REFERENCE TO RELATED APPLICATIONS

This application claims the benefit of U.S. Provisional Application No. 60/237,516 filed Oct. 4, 2000.

FIELD OF THE INVENTION

This invention pertains to a novel emulsion polymerization process for the production of fluoroelastomers wherein a certain class of hydrocarbon sulfonate anionic surfactant is used as the dispersing agent.

BACKGROUND OF THE INVENTION

Fluoroelastomers having excellent heat resistance, oil resistance, and chemical resistance have been used widely for sealing materials, containers and hoses.

Production of such fluoroelastomers by emulsion and solution polymerization methods is well known in the art; see for example U.S. Pat. Nos. 4,214,060 and 4,281,092. Generally, fluoroelastomers are produced in an emulsion polymerization process wherein a water-soluble polymerization initiator and a relatively large amount of surfactant are employed. The surfactant most often used for such processes has been ammonium perfluorooctanoate (C-8). Fluoroelastomers prepared in such processes leave the reactor in the form of a dispersion.

While C-8 works very well as a surfactant in the polymerization process, it is relatively expensive, and its future commercial availability is uncertain. Thus, it would be desirable to find other surfactants effective for use in the emulsion polymerization of fluoroelastomers.

Efforts to replace C-8 have focussed on other expensive anionic fluorosurfactants such as 1) F—$(CF_2CF_2)_n$CH$_2$CH$_2$—OSO$_3$M, where n is an integer from 2-8, or mixtures thereof, and M is an alkali metal cation, hydrogen ion or ammonium ion (U.S. Pat. No. 4,524,197); 2) F—$(CF_2CF_2)_n$CH$_2$CH$_2$—SO$_3$M, where n is an integer from 2-8, or mixtures thereof, and M is an alkali metal cation, hydrogen ion or ammonium ion (U.S. Pat. No. 4,380,618); and 3) $C_6F_{13}$CH$_2$CH$_2$SO$_3$M wherein M is a cation having a valence of 1 (U.S. Pat. No. 5,688,884). Such fluorinated surfactants are effective in forming stable dispersions of highly fluorinated fluoroelastomer latex particles during the emulsion polymerization process because of the highly fluorinated structure of the surfactants.

Hydrocarbon sulfonate surfactants such as sodium dodecylbenzenesulfonate and sodium sulfosuccinate have been used in the emulsion polymerization of tetrafluoroethylene/propylene copolymers (G. Kostov et al. in God. Vissh. Kim.-Tekhnol. Inst., 29(2), 316–320 (1983)). These copolymers contain a large amount of propylene units and have a relatively low amount of fluorine, i.e. less than 58 weight percent fluorine. It is believed that hydrocarbon sulfonate surfactants can be successfully employed in the emulsion polymerization of tetrafluoroethylene/propylene copolymers because of the compatibility between the hydrocarbon surfactant and the high level of propylene units present in the copolymer. Such surfactants would be unlikely to satisfactorily stabilize highly fluorinated (i.e. having at least 58 wt. % fluorine) fluoroelastomer latex particles.

SUMMARY OF THE INVENTION

Surprisingly, it has been found that certain hydrocarbon sulfonate surfactants may be used to manufacture highly fluorinated fluoroelastomers. One aspect of the present invention provides an emulsion polymerization process for the production of fluoroelastomers, said fluoroelastomers having at least 58 weight percent fluorine, comprising:

(A) charging a reactor with a quantity of an aqueous solution comprising a surfactant of the formula CH$_3$—(CH$_2$)$_n$—SO$_3$M where n is an integer from 6 to 17, or mixtures thereof, and M is a cation having a valence of 1;

(B) charging the reactor with a quantity of a monomer mixture to form a reaction medium, said monomer mixture comprising i) from 25 to 70 weight percent, based on total weight of the monomer mixture, of a first monomer, said first monomer selected from the group consisting of vinylidene fluoride and tetrafluoroethylene, and ii) between 75 and 30 weight percent, based on total weight of the monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof; and (C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C.

In other aspects of the invention, the surfactant employed in (A) may be substituted by CH$_3$—(CH$_2$)$_n$—$C_6H_4$—SO$_3$M or CH$_3$—(CH$_2$)$_n$—CH=CHCH$_2$—SO$_3$M, wherein n and M are as defined above.

DETAILED DESCRIPTION OF THE INVENTION

The present invention is directed to an emulsion polymerization process for producing a fluoroelastomer. By "fluoroelastomer" is meant an amorphous elastomeric fluoropolymer. The fluoropolymer may be partially fluorinated or perfluorinated, so long as it contains at least 58 percent by weight fluorine, preferably at least 64 wt. % fluorine. Fluoroelastomers made by the process of this invention contain between 25 to 70 weight percent, based on the weight of the fluoroelastomer, of copolymerized units of a first monomer which may be vinylidene fluoride (VF$_2$) or tetrafluoroethylene (TFE). The remaining units in the fluoroelastomers are comprised of one or more additional copolymerized monomers, different from said first monomer, selected from the group consisting of fluorine-containing olefins, fluorine-containing vinyl ethers, hydrocarbon olefins and mixtures thereof.

According to the present invention, fluorine-containing olefins copolymerizable with the first monomer include, but are not limited to, vinylidene fluoride, hexafluoropropylene (HFP), tetrafluoroethylene (TFE), 1,2,3,3,3-pentafluoropropene (1-HPFP), chlorotrifluoroethylene (CTFE) and vinyl fluoride.

The fluorine-containing vinyl ethers employed in the present invention include, but are not limited to perfluoro (alkyl vinyl) ethers. Perfluoro(alkyl vinyl) ethers (PAVE) suitable for use as monomers include those of the formula $$CF_2=CFO(R_fO)_n(R_f'O)_mR_f''$$ (I)

where $R_f$ and $R_f'$ are different linear or branched perfluoroalkylene groups of 2–6 carbon atoms, m and n are independently 0–10, and $R_f''$ is a perfluoroalkyl group of 1–6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether (PMVE) and perfluoro (propyl vinyl) ether (PPVE). Other useful monomers include compounds of the formula $$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$. Preferred members of this class are those in which $R_f$ is $C_3F_7$, m=0, and n=1.

Additional perfluoro(alkyl vinyl) ether monomers include compounds of the formula $$CF_2=CFO\,[(CF_2CF\,\{CF_3\,\}O)_n(CF_2CF_2CF_2O)_m(CF_2)p]C_xF_{2x+1} \qquad (IV)$$

where m and n independently=0–10, p=0–3, and x=1–5. Preferred members of this class include compounds where n=0–1, m=0–1, and x=1.

Other examples of useful perfluoro(alkyl vinyl ethers) include $$CF_2=CFOCF_2CF(CF_3)O(CF_2O)_mC_nF_{2n+1} \qquad (V)$$

where n=1–5, m=1–3, and where, preferably, n=1.

If copolymerized units of PAVE are present in fluoroelastomers prepared by the process of the invention, the PAVE content generally ranges from 25 to 75 weight percent, based on the total weight of the fluoroelastomer. If perfluoro (methyl vinyl) ether is used, then the fluoroelastomer preferably contains between 30 and 55 wt. % copolymerized PMVE units.

Hydrocarbon olefins useful in the fluoroelastomers prepared by the process of this invention include, but are not limited to ethylene (E) and propylene (P). If copolymerized units of a hydrocarbon olefin are present in the fluoroelastomers prepared by the process of this invention, hydrocarbon olefin content is generally 4 to 30 weight percent The fluoroelastomers prepared by the process of the present invention may also, optionally, comprise units of one or more cure site monomers. Examples of suitable cure site monomers include: i) bromine -containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP); viii) perfluoro(2-phenoxypropyl vinyl) ether; and ix) non-conjugated dienes.

Brominated cure site monomers may contain other halogens, preferably fluorine. Examples of brominated olefin cure site monomers are $CF_2=CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromo-perfluoroethyl perfluorovinyl ether and fluorinated compounds of the class $CF_2Br-R_f-O-CF=CF_2$ ($R_f$ is a perfluoroalkylene group), such as $CF_2BrCF_2O-CF=CF_2$, and fluorovinyl ethers of the class $ROCF=CFBr$ or $ROCBr=CF_2$ (where R is a lower alkyl group or fluoroalkyl group) such as $CH_3OCF=CFBr$ or $CF_3CH_2OCF=CFBr$.

Suitable iodinated cure site monomers include iodinated olefins of the formula: $CHR=CH-Z-CH_2CHR-I$, wherein R is $-H$ or $-CH_3$; Z is a $C_1-C_{18}$ (per) fluoroalkylene radical, linear or branched, optionally containing one or more ether oxygen atoms, or a (per) fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1–3, such as disclosed in U.S. Pat. No. 5,717,036. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodo-perfluoroethyl perfluorovinyl ether are also useful cure site monomers.

Useful nitrile-containing cure site monomers include those of the formulas shown below.

$$CF_2=CF-O(CF_2)_n-CN \qquad (VI)$$

where n=2–12, preferably 2–6;

$$CF_2=CF-O[CF_2-CF(CF_3)-O]_n-CF_2-CF(CF_3)-CN \qquad (VII)$$

where n=0–4, preferably 0–2;

$$CF_2=CF-[OCF_2CF(CF_3)]_x-O-(CF_2)_n-CN \qquad (VIII)$$

where x=1–2, and n=1–4; and $$CF_2=CF-O-(CF_2)_n-O-CF(CF_3)CN \qquad (IX)$$

where n=2–4. Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \qquad (X)$$

i.e. perfluoro(8-cyano-5-methyl-3,6-dioxa-1-octene) or 8-CNVE.

Examples of non-conjugated diene cure site monomers include, but are not limited to 1,4-pentadiene; 1,5-hexadiene; 1,7-octadiene; 3,3,4,4-tetrafluoro-1,5-hexadiene; and others, such as those disclosed in Canadian Patent 2,067,891 and European Patent 0784064A1. A suitable triene is 8-methyl-4-ethylidene-1,7-octadiene.

Of the cure site monomers listed above, preferred compounds, for situations wherein the fluoroelastomer will be cured with peroxide, include 4-bromo-3,3,4,4-tetrafluorobutene-1 (BTFB); 4-iodo-3,3,4,4-tetrafluorobutene-1 (ITFB); allyl iodide; bromotrifluoroethylene and 8-CNVE. When the fluoroelastomer will be cured with a polyol, 2-HPFP or perfluoro(2-phenoxypropyl vinyl) ether is the preferred cure site monomer. When the fluoroelastomer will be cured with a tetraamine, bis (aminophenol) or bis(thioaminophenol), 8-CNVE is the preferred cure site monomer.

Units of cure site monomer, when present in the fluoroelastomers manufactured by the process of this invention, are typically present at a level of 0.05–10 wt. % (based on the total weight of fluoroelastomer), preferably 0.05–5 wt. % and most preferably between 0.05 and 3 wt. %.

Specific fluoroelastomers which may be produced by the process of this invention include, but are not limited to those having at least 58 wt. % fluorine and comprising copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro (methyl vinyl) ether, tetrafluoroethylene and 4-bromo-3,3,4,4-tetrafluorobutene-1; vi) vinylidene fluoride, perfluoro (methyl vinyl) ether, tetrafluoroethylene and 4-iodo-3,3,4,4-tetrafluorobutene-1; vii) vinylidene fluoride, perfluoro (methyl vinyl) ether, tetrafluoroethylene and 1,1,3,3,3-pentafluoropropene; viii) tetrafluoroethylene, perfluoro (methyl vinyl) ether and ethylene; ix) tetrafluoroethylene, perfluoro(methyl vinyl) ether, ethylene and 4-bromo-3,3,4,4-tetrafluorobutene-1; x) tetrafluoroethylene, perfluoro (methyl vinyl) ether, ethylene and 4-iodo-3,3,4,4-tetrafluorobutene-1; xi) tetrafluoroethylene, propylene and vinylidene fluoride; xii) tetrafluoroethylene and perfluoro (methyl vinyl) ether; xiii) tetrafluoroethylene, perfluoro (methyl vinyl) ether and perfluoro(8-cyano-5-methyl-3,6-dioxa-1-octene); xiv) tetrafluoroethylene, perfluoro(methyl vinyl) ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl) ether and perfluoro(2-phenoxypropyl vinyl) ether.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005–5 wt. %, preferably 0.05–3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4-tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluorobutane; 2-iodo-1-hydroperfluoroethane, etc. Also included are the cyano-iodine chain transfer agents disclosed European Patent 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other chain transfer agents suitable for use in the process of this invention include those disclosed in U.S. Pat. No. 3,707,529. Examples of such agents include isopropanol, diethylmalonate, ethyl acetate, carbon tetrachloride, acetone and dodecyl mercaptan.

Cure site monomers and chain transfer agents may be added to the reactor neat or as solutions. In addition to being introduced into the reactor near the beginning of polymerization, quantities of chain transfer agent may be added throughout the entire polymerization reaction period, depending upon the desired composition of the fluoroelastomer being produced, the chain transfer agent being employed, and the total reaction time.

Surprisingly, it has been found that a surfactant of the formula $CH_3-(CH_2)_n-SO_3M$, $CH_3-(CH_2)_n-C_6H_4-SO_3M$, or $CH_3-(CH_2)_n-CH=CHCH_2-SO_3M$ may be employed as the dispersing agent in the polymerization process of this invention. Surfactant of formula $CH_3-(CH_2)_n-SO_3M$ is preferred. In these formulae n is an integer from 6 to 17, or mixtures thereof, and M is a cation having a valence of 1 (e.g. $H^+$, $Na^+$, $K^+$, $NH_{4+}$, etc.). Preferably n is an integer from 7 to 14. Surfactants having n values less than 6 tend to be poor soaps and poor dispersing agents for highly fluorinated fluoroelastomer latex particles. Surfactants having n values greater than 17, tend to be insufficiently soluble in water to be useful in this invention, or form insoluble salts with coagulants which are difficult to wash from fluoroelastomer crumb. The dispersing agent may also be a mixture of any two or more surfactants of the above general formulae. Specific examples of surfactants which may be employed in the emulsion polymerization process of the invention include, but are not limited to $CH_3(CH_2)_7-SO_3Na$; $CH_3(CH_2)_{11}C_6H_4-SO_3Na$; $CH_3-(CH_2)_8-CH=CH-CH_2-SO_3Na$.

One skilled in the art of fluoroelastomer preparation would not predict that a hydrocarbon surfactant of the above general formulae would be capable of stabilizing highly fluorinated (i.e. containing at least 58 wt. % fluorine) fluoroelastomer latex particles. Therefore, such a surfactant would not likely be useful in an emulsion polymerization process for manufacturing highly fluorinated fluoroelastomers. Also, hydrocarbon surfactants generally act as strong chain transfer agents (due to the large number of C—H bonds available for attack by radicals) and limit the molecular weight of polymers prepared in their presence. However, stable fluoroelastomer latex dispersions are surprisingly formed in the emulsion polymerization process of this invention which employs the above hydrocarbon surfactant as dispersing agent. Also, high molecular weight (i.e. having a number average molecular weight of 106 or greater) fluoroelastomers may readily be prepared in the process of this invention.

The amount of surfactant to be employed in the aqueous emulsion polymerization solution is determined by balancing emulsion stability and polymerization rate with foam generation. If too little surfactant is used, excessive reactor fouling will occur and reaction rate may be undesirably slow. If too much surfactant is used, excessive foam will be generated and it will be difficult to remove the excess surfactant from the fluoroelastomer, thus retarding the vulcanization of the fluoroelastomer with bisphenol curatives. In an emulsion polymerization process of this invention, the amount of surfactant employed is typically 0.05 to 3 wt. %, based on the total weight of fluoroelastomer being produced. The preceding amounts are based on the amount of active ingredient, not on amount of a surfactant solution containing less that 100% active ingredient.

The emulsion polymerization process of this invention may be a continuous, semi-batch or batch process.

In the semi-batch emulsion polymerization process of this invention, a gaseous monomer mixture of a desired composition (initial monomer charge) is introduced into a reactor which contains an aqueous solution. The reactor is typically not completely filled with the aqueous solution, so that a vapor space remains. The aqueous solution comprises a hydrocarbon sulfonate surfactant dispersing agent of the type discussed above. Optionally, the aqueous solution may contain a pH buffer, such as a phosphate or acetate buffer for controlling the pH of the polymerization reaction. Instead of a buffer, a base, such as NaOH may be used to control pH. Generally, pH is controlled to between 1 and 7 (preferably 3–7), depending upon the type of fluoroelastomer being prepared. Alternatively, or additionally, pH buffer or base may be added to the reactor at various times throughout the polymerization reaction, either alone or in combination with other ingredients such as polymerization initiator, liquid cure site monomer, additional hydrocarbon sulfonate surfactant or chain transfer agent. Also optionally, the initial aqueous solution may contain a water-soluble inorganic peroxide polymerization initiator. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of a first monomer of either TFE or $VF_2$ and one or more additional monomers which are different from the first monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring. In the initial gaseous monomer charge, the relative amount of each monomer is dictated by reaction kinetics and is set so as to result in a fluoroelastomer having the desired ratio of copolymerized monomer units (i.e. very slow reacting monomers must be present in a higher amount relative to the other monomers than is desired in the composition of the fluoroelastomer to be produced).

The temperature of the semi-batch reaction mixture is maintained in the range of 25° C.–130° C., preferably 50° C.–100° C. Polymerization begins when the initiator either thermally decomposes or reacts with reducing agent and the resulting radicals react with dispersed monomer.

Additional quantities of the gaseous major monomers and cure site monomer (incremental feed) are added at a controlled rate throughout the polymerization in order to maintain a constant reactor pressure at a controlled temperature. The relative ratio of monomers contained in the incremental feed is set to be approximately the same as the desired ratio of copolymerized monomer units in the resulting fluoroelastomer. Thus, the incremental feed contains between 25 to 70 weight percent, based on the total weight of the monomer mixture, of a first monomer of either TFE or $VF_2$ and 75 to 30 weight percent of one or more additional monomers that are different from the first monomer. Chain transfer agent may also, optionally, be introduced into the reactor at any point during this stage of the polymerization. Typically, additional polymerization initiator and hydrocarbon sulfonate surfactant are also fed to the reactor during this stage of polymerization. The amount of polymer formed is approximately equal to the cumulative amount of incremental monomer feed. One skilled in the art will recognize that the molar ratio of monomers in the incremental feed is not necessarily exactly the same as that of the desired (i.e. selected) copolymerized monomer unit composition in the resulting fluoroelastomer because the composition of the initial charge may not be exactly that required for the selected final fluoroelastomer composition, or because a portion of the monomers in the incremental feed may dissolve into the polymer particles already formed, without reacting. Polymerization times in the range of from 2 to 30 hours are typically employed in this semi-batch polymerization process.

The continuous emulsion polymerization process of this invention differs from the semi-batch process in the following manner. The reactor is completely filled with aqueous solution so that there is no vapor space. Gaseous monomers and solutions of other ingredients such as water-soluble monomers, chain transfer agents, buffer, bases, polymerization initiator, surfactant, etc., are fed to the reactor in separate streams at a constant rate. Feed rates are controlled so that the average polymer residence time in the reactor is generally between 0.2 to 4 hours. Short residence times are employed for reactive monomers, whereas less reactive monomers such as perfluoro(alkyl vinyl) ethers require more time. The temperature of the continuous process reaction mixture is maintained in the range of 25° C.–130° C., preferably 80° C.–120° C. Also, fluoroelastomer latex particles are more readily formed in the continuous process so that a nucleating agent is not typically required in order to start the polymerization reaction.

In the process of this invention, the polymerization temperature is maintained in the range of 25°–130° C. If the temperature is below 25° C., the rate of polymerization is too slow for efficient reaction on a commercial scale, while if the temperature is above 130° C., the reactor pressure required in order to maintain polymerization is too high to be practical.

The polymerization pressure is controlled in the range of 0.5 to 10 MPa, preferably 1 to 6.2 MPa. In a semi-batch process, the desired polymerization pressure is initially achieved by adjusting the amount of gaseous monomers in the initial charge, and after the reaction is initiated, the pressure is adjusted by controlling the incremental gaseous monomer feed. In a continuous process, pressure is adjusted by a back-pressure regulator in the dispersion effluent line. The polymerization pressure is set in the above range because if it is below 1 MPa, the monomer concentration in the polymerization reaction system is too low to obtain a satisfactory reaction rate. In addition, the molecular weight does not increase sufficiently. If the pressure is above 10 MPa, the cost of the required high pressure equipment is very high.

The amount of fluoroelastomer copolymer formed is approximately equal to the amount of incremental feed charged, and is in the range of 10–30 parts by weight of copolymer per 100 parts by weight of aqueous medium, preferably in the range of 20–25 parts by weight of the copolymer. The degree of copolymer formation is set in the above range because if it is less than 10 parts by weight, productivity is undesirably low, while if it is above 30 parts by weight, the solids content becomes too high for satisfactory stirring.

Water-soluble peroxides which may be used to initiate polymerization in this invention include, for example, the ammonium, sodium or potassium salts of hydrogen persulfate. In a redox-type initiation, a reducing agent such as sodium sulfite, is present in addition to the peroxide. These water-soluble peroxides may be used alone or as a mixture of two or more types. The amount to be used is selected generally in the range of 0.01 to 0.4 parts by weight per 100 parts by weight of polymer, preferably 0.05 to 0.3. During polymerization some of the fluoroelastomer polymer chain ends are capped with fragments generated by the decomposition of these peroxides.

Optionally, fluoroelastomer gum or crumb may be isolated from the fluoroelastomer dispersions produced by the process of this invention by the addition of a coagulating agent to the dispersion. Any coagulating agent known in the art may be used. Preferably, a coagulating agent is chosen which forms a water-soluble salt with the surfactant contained in the dispersion. Otherwise, precipitated surfactant salt may become entrained in the isolated fluoroelastomer and then retard curing of the fluoroelastomer with bisphenol-type curatives.

In one isolation process, the fluoroelastomer dispersion is adjusted to a pH less than 4 and then coagulated by addition of an aluminum salt. Undesirable insoluble aluminum hydroxides form at pH values greater than 4. Aluminum salts useful as coagulating agents include, but are not limited to aluminum sulfate and alums of the general formula M'Al(SO$_4$)$_2$·12H$_2$O, wherein M' is a univalent cation, other than lithium. The resulting coagulated fluoroelastomer may then be filtered, washed and dried.

In addition to aluminum salts, common coagulants such as calcium salts (e.g. calcium nitrate) or magnesium salts (e.g. magnesium sulfate), and some salts of univalent cations (e.g. sodium chloride or potassium chloride), may be used to coagulate fluoroelastomers produced in a process employing a surfactant that forms a water soluble salt with such coagulants.

Another aspect of this invention is the curable fluoroelastomers that are produced by the process of this invention. Such fluoroelastomers are generally molded and then vulcanized during fabrication into finished products such as seals, wire coatings, hose, etc. Suitable vulcanization methods employ, for example, polyol, polyamine, organic peroxide, organotin, bis(aminophenol), tetraamine, or bis(thioaminophenol) compounds as curatives.

The fluoroelastomers prepared by the process of this invention are useful in many industrial applications including seals, wire coatings, tubing and laminates.

EXAMPLES

TEST METHODS

Mooney viscosity, ML (1+10), was determined according to ASTM D1646 with an L (large) type rotor at 121° C., using a preheating time of one minute and rotor operation time of 10 minutes.

The invention is further illustrated by, but is not limited to, the following examples.

Example 1

A VF$_2$/HFP copolymer fluoroelastomer was prepared by a continuous emulsion polymerization process of the invention, carried out at 120° C. in a well-stirred 4.0-liter stainless steel liquid full reaction vessel. An aqueous solution, consisting of 4.39 g/hour (g/h) ammonium persulfate initiator, 10.53 g/h sodium phosphate dibasic heptahydrate buffer, 2.50 g/h sodium octyl sulfonate surfactant, and 2.40 g/h isopropanol chain transfer agent in deionized water, was fed to the reactor at a rate of 10 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 1514 g/h vinylidene fluoride (VF$_2$), and 1137 g/h hexafluoropropylene (HFP), fed through a diaphragm compressor. After 2.0 hours, collection of effluent dispersion was begun and collection continued for 5 hours. The effluent polymer dispersion, which had a pH of 3.97 and contained 20.0 wt. % solids, was separated from residual monomers in a degassing vessel at atmospheric pressure. Fluoroelastomer polymer was isolated using calcium nitrate coagulant solution. The coagulated polymer was allowed to settle, supernatant serum was removed, and the polymer was washed by reslurrying in water six times before filtering. The wet crumb was dried in an air oven at approximately 50°–65° C. to a moisture content of less than 1%. About 12.4 kg of polymer was recovered at an overall conversion of 93.5%. The product, comprised of 60.0 wt. % VF$_2$ units and 40.0 wt. % HFP units, was an amorphous elastomer having a glass transition temperature of −18° C., as determined by differential scanning calorimetry (heating mode, 10° C./minute, inflection point of transition). Inherent viscosity of the elastomer was 0.83 dL/g, measured at 30° C. in methyl ethyl ketone, and Mooney viscosity, ML(1+10), was 52.

Example 2

A VF$_2$/HFP copolymer fluoroelastomer was prepared by a continuous emulsion polymerization process of the invention, carried out at 120° C. in a well-stirred 4.0-liter stainless steel liquid full reaction vessel. An aqueous solution, consisting of 4.21 g/hour (g/h) ammonium persulfate, 1.82 g/h sodium hydroxide, 2.50 g/h sodium dodecyl benzene sulfonate surfactant, and 2.40 g/h isopropanol in deionized water, was fed to the reactor at a rate of 10 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 1527 g/h vinylidene fluoride (VF$_2$), and 1131 g/h hexafluoropropylene (HFP) fed through a diaphragm compressor. After 2.0 hours, collection of effluent dispersion was begun and collection continued for 6 hours. The effluent polymer dispersion, which had a pH of 4.0 and contained 19.9 wt. % solids, was separated from residual monomers in a degassing vessel at atmospheric pressure. Fluoroelastomer product was isolated using aluminum sulfate solution coagulant. The coagulated polymer was allowed to settle, supernatant serum was removed, and the polymer was washed by reslurrying in water three times before filtering. The wet crumb was dried in an air oven at approximately 50°–65° C. to a moisture content of less than 1%. About 15 kg of polymer was recovered at an overall conversion of 93.3%. The product, comprised of 60.0 wt. % VF$_2$ units and 40.0 wt. % HFP units, was an amorphous elastomer having a glass transition temperature of −18° C., as determined by differential scanning calorimetry (heating mode, 10° C./minute, inflection point of transition). Inherent viscosity of the elastomer was 0.88 dL/g, measured at 30° C. in methyl ethyl ketone, and Mooney viscosity, ML(1+10), was 61.

Comparative Example A

A VF$_2$/HFP copolymer fluoroelastomer was prepared by a continuous emulsion polymerization process of the prior art at 120° C. in a well-stirred 4.0-liter stainless steel liquid full reaction vessel. An aqueous solution, consisting of 4.39 g/h ammonium persulfate, 10.53 g/h sodium phosphate dibasic heptahydrate, 7.25 g/h ammonium perfluorooctanoate surfactant (C-8), and 2.40 g/h isopropanol in deionized water, was fed to the reactor at a rate of 10 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 1521 g/h vinylidene fluoride (VF$_2$), and 1142 g/h hexafluoropropylene (HFP) fed through a diaphragm compressor. After 2 hours, collection of effluent dispersion was initiated and continued for 8.5 hours. The effluent polymer dispersion, which had a pH of 3.9 and contained 20.1 wt. % solids, was separated from residual monomers in a degassing vessel at atmospheric pressure. Fluoroelastomer product was isolated using calcium nitrate coagulant solution. The coagulated polymer was allowed to settle, supernatant serum was removed, and the polymer was washed by reslurrying in water four times before filtering. The wet crumb was dried in an air oven at approximately 50–65° C. to a moisture content of less than 1%. About 21 kg of polymer was recovered at an overall conversion of 93.99%. The product, comprised of 59.9 wt. % VF$_2$ units and 40.1 wt. % HFP units, was an amorphous elastomer having a glass transition temperature of –17° C., as determined by differential scanning calorimetry (heating mode, 10° C./minute, inflection point of transition). Inherent viscosity of the elastomer was 0.80 dL/g, measured at 30° C. in methyl ethyl ketone, and Mooney viscosity, ML(1+10), was 51.

Example 3

A VF$_2$/HFP/TFE copolymer fluoroelastomer was prepared by a continuous emulsion polymerization process of the invention, carried out at 115° C. in a well-stirred 4.0-liter stainless steel liquid full reaction vessel. An aqueous solution, consisting of 3.74 g/hour (g/h) ammonium persulfate, 11.26 g/h sodium phosphate dibasic heptahydrate, 3.75 g/h sodium octyl sulfonate, and 2.4 g/h isopropanol in deionized water, was fed to the reactor at a rate of 10 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 594 g/h tetrafluoroethylene (TFE), 1119 g/h vinylidene fluoride (VF$_2$), and 897 g/h hexafluoropropylene (HFP) fed through a diaphragm compressor. After 2.0 hours, collection of effluent dispersion was begun and continued for 5 hours. The effluent polymer dispersion, which had a pH of 4.1 and contained 19.9 wt. % solids, was separated from residual monomers in a degassing vessel at atmospheric pressure. Fluoroelastomer product was isolated using calcium nitrate solution. The coagulated polymer was allowed to settle, supernatant serum was removed, and the polymer was washed by reslurrying in water three times before filtering. The wet crumb was dried in an air oven at approximately 50–65° C. to a moisture content of less than 1%. About 12 kg of polymer was recovered at an overall conversion of 94.6%. The product, comprised of 24.0 wt. % TFE units, 45.0 wt. % VF$_2$ units, and 31.0 wt. % HFP units, was an amorphous elastomer having a glass transition temperature of –14° C., as determined by differential scanning calorimetry (heating mode, 10° C./minute, inflection point of transition). Inherent viscosity of the elastomer was 0.76 dL/g, measured at 30° C. in methyl ethyl ketone, and Mooney viscosity, ML(1+10), was 64.

Comparative Example B

A VF$_2$/HFP/TFE copolymer fluoroelastomer was prepared by a continuous emulsion polymerization process of the prior art, carried out at 115° C. in a well-stirred 4.0-liter stainless steel liquid full reaction vessel. An aqueous solution, consisting of 3.74 g/hour (g/h) ammonium persulfate, 11.26 g/h sodium phosphate dibasic heptahydrate, 7.25 g/h ammonium perfluorooctanoate, and 2.40 g/h isopropanol in deionized water, was fed to the reactor at a rate of 10 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 594 g/h tetrafluoroethylene (TFE), 1119 g/h vinylidene fluoride (VF$_2$), and 898 g/h hexafluoropropylene (HFP) fed through a diaphragm compressor. After 2.0 hours, collection of effluent dispersion was begun and continued for 8 hours. The effluent polymer dispersion, which had a pH of 4.1 and contained 20.0 wt. % solids, was separated from residual monomers in a degassing vessel at atmospheric pressure. Fluoroelastomer product was isolated using calcium nitrate solution. The coagulated polymer was allowed to settle, supernatant serum was removed, and the polymer was washed by reslurrying in water three times before filtering. The wet crumb was dried in an air oven at approximately 50°–65° C. to a moisture content of less than 1%. About 19 kg of polymer was recovered at an overall conversion of 95.3%. The product, comprised of 23.8 wt. % TFE units, 44.8 wt. % VF$_2$ units, and 31.4 wt. % HFP units, was an amorphous elastomer having a glass transition temperature of –14° C., as determined by differential scanning calorimetry (heating mode, 10° C./minute, inflection point of transition). Inherent viscosity of the elastomer was 0.71 dL/g, measured at 30° C. in methyl ethyl ketone, and Mooney viscosity, ML(1+10), was 59.

Example 4

A TFE/P/NVF$_2$ copolymer fluoroelastomer was prepared by a semi-batch emulsion polymerization of the invention, carried out at 60° C. in a well-stirred reaction vessel. A 33-liter, horizontally agitated reactor was charged with 20 liters of deionized, deoxygenated water, 100 g of sodium dodecyl 2-alkene sulfonate surfactant and 70 g of sodium phosphate dibasic heptahydrate buffer. The reactor was heated to 60° C. and then pressurized to 2.07 MPa with a mixture of 75.0% wt. % TFE, 20.0 wt. % VF$_2$, and 5.0 wt. % propylene (P). A 274 ml aliquot of a 10 wt. % ammonium persulfate initiator solution was then added. A gaseous monomer mixture of 70.0% wt. % TFE, 10.0 wt. % VF$_2$, and 20.0 wt. % propylene was fed to the reactor in order to maintain a pressure of 2.07 MPa throughout the polymerization. Additional initiator solution was fed to the reactor continuously at the rate of 5 ml/hour through the end of the polymerization reaction. After a total of 8932 g monomer mixture had been supplied to the reactor, monomer addition was discontinued and the reactor was purged of residual monomer. The total reaction time was 47 hours. The resulting emulsion was coagulated by addition of aluminum potassium sulfate solution and the decanted polymer washed with deionized water. The polymer crumb was dried for two days at 60° C. The product, comprised of 70 wt. % TFE units, 10 wt. % VF$_2$ units, and 20 wt. % propylene units, was an amorphous elastomer having a glass transition temperature of –0.4° C., as determined by differential scanning calorimetry (heating mode, 10° C./minute, inflection point of transition). Mooney viscosity, ML(1+10), was 23.

Comparative Example C

A TFE/P/VF$_2$ copolymer fluoroelastomer was prepared by a semi-batch emulsion polymerization process of the prior art, carried out at 60° C. in a well-stirred reaction vessel. A 33-liter, horizontally agitated reactor was charged with 20 liters of deionized, deoxygenated water, 300 g ammonium perfluorooctanoate (C-8) and 90 g sodium phosphate dibasic heptahydrate. The reactor was heated to 60° C. and then pressurized to 2.07 MPa with a mixture of 75.0 wt. % TFE, 20.0 wt. % VF$_2$, and 5.0 wt. % propylene. A 250 ml aliquot of a 10 wt. % ammonium persulfate initiator solution was then added. A gaseous monomer mixture of 70.0 wt. % TFE, 10.0 wt. % VF$_2$, and 20.0 wt. % propylene was fed to the reactor to maintain a pressure of 2.07 MPa throughout the polymerization. Additional initiator solution was fed to the reactor continuously at the rate of 5 ml/hour through the end of reaction. After a total of 8980 g monomer mixture had been supplied to the reactor, monomer addition was discontinued and the reactor was purged of residual monomer. The total reaction time was 29 hours. The resulting emulsion was coagulated by addition of aluminum potassium sulfate solution and the decanted polymer washed with deionized water. The polymer crumb was dried for two days at 60° C. The product was comprised of 70 wt. % TFE units, 10 wt. % VF$_2$ units, and 20 wt. % HFP units.

Example 6

An E/TFE/PMVE copolymer fluoroelastomer was prepared by a semi-batch emulsion polymerization process of the invention, carried out at 80° C. in a well-stirred reaction vessel. A 33-liter, horizontally agitated reactor was charged with 20 liters of deionized, deoxygenated water, 100 g of sodium phosphate dibasic heptahydrate. The reactor was heated to 80° C. and then pressurized to 2.07 MPa with a mixture of 30.0 wt. % TFE, and 70.0 wt. % PMVE. A 149 ml aliquot of a 5 wt. % ammonium persulfate and 20 wt. % sodium octyl sulfonate initiator/soap solution was then added. A gaseous monomer mixture of 7.8 wt. % ethylene (E), 44.6 wt. % TFE, and 47.6 wt. % PMVE was fed to the reactor to maintain a pressure of 2.07 MPa throughout the polymerization. After 400 g of the latter monomer mixture had been reacted, a stream of BTFB cure site monomer was fed to the reactor at the rate of 1.3% of the rate of gaseous monomer mixture feed. Additional initiator/soap solution was fed to the reactor continuously at the rate of 50 ml/hour until a total of 500 ml of initiator/soap solution had been added. It was then switched to a 5 wt. % ammonium persulfate initiator solution and fed continuously at the rate of 50 ml/hour through the end of the polymerization reaction. After a total of 9605 g monomer mixture had been supplied to the reactor, monomer addition was discontinued and the reactor was purged of residual monomer. The total reaction time was 27 hours. The resulting fluoroelastomer dispersion was coagulated by addition of magnesium sulfate solution and the decanted polymer was washed with deionized water. The polymer crumb was dried for two days at 60° C. The product, comprised of 46.6 wt. % TFE units, 43.3 wt. % PMVE units, 9.1 wt. % ethylene, and 1.1 wt. % BTFB units, was an amorphous elastomer having a glass transition temperature of −10° C., as determined by differential scanning calorimetry (heating mode, 10° C./minute, inflection point of transition). Mooney viscosity, ML(1+10), was 76.

Example 7

An E/TFE/PMVE copolymer fluoroelastomer was prepared by a semi-batch emulsion polymerization of the invention, carried out at 80° C. in a well-stirred reaction vessel. A 33-liter, horizontally agitated reactor was charged with 17 liters of deionized, deoxygenated water, 100 g of sodium phosphate dibasic heptahydrate, 86 g sodium octyl sulfonate, and 4000 g of seed E/TFE/PMVE fluoroelastomer dispersion from Example 6. The reactor was heated to 80° C. and then pressurized to 2.07 MPa with a mixture of 7.8 wt. % ethylene, 44.6 wt. % TFE, and 47.6 wt. % PMVE. A 128 ml aliquot of a 5 wt. % ammonium persulfate initiator solution was then added. A gaseous monomer mixture of 7.8 wt. % ethylene, 44.6 wt. % TFE, and 47.6 wt. % PMVE was fed to the reactor to maintain a pressure of 2.07 MPa throughout the polymerization. After 400 g of gaseous monomer mixture had been reacted, a stream of BTFB cure site monomer was fed to the reactor at a rate of 1.3% of the rate of gaseous monomer mixture feed. Additional initiator solution was fed continuously at a rate of 50 ml through the end of reaction. After a total of 8466 g monomer mixture was supplied to the reactor, monomer addition was discontinued and the reactor was purged of residual monomer. The total reaction time was 11.3 hours. The resulting emulsion was coagulated by addition of magnesium sulfate solution and the decanted polymer washed with deionized water. The polymer crumb was dried for two days at 60° C. The product, comprised of 57.5 wt. % TFE units, 29.2 wt. % PMVE units, 12.1 wt. % ethylene, and 1.1 wt. % BTFB units, was an amorphous elastomer having a glass transition temperature of −9° C., as determined by differential scanning calorimetry (heating mode, 10° C./minute, inflection point of transition). Mooney viscosity, ML(1+10), was 95.

Comparative Example D

An E/TFE/PMVE copolymer fluoroelastomer was prepared by a semi-batch emulsion polymerization process of the prior art, carried out at 80° C. in a well-stirred reaction vessel. A 33-liter, horizontally agitated reactor was charged with 20 liters of deionized, deoxygenated water, 100 g of sodium phosphate dibasic heptahydrate, and 400 g ammonium perfluorooctanoate. The reactor was heated to 80° C. and then pressurized to 2.07 MPa with a mixture 20 wt. % TFE and 80 wt. % PMVE. A 35 ml aliquot of a 10 wt. % ammonium persulfate initiator solution was then added. A gaseous monomer mixture of 7.8 wt. % ethylene, 44.6 wt. % TFE, and 47.6 wt. % PMVE was applied to the reactor to maintain a pressure of 2.07 MPa throughout the polymerization. After 400 g of gaseous monomer mixture had been reacted, a stream of BTFB cure site monomer was fed to the reactor at a rate of 1.3% of the rate of gaseous monomer mixture feed. Additional ammonium persulfate initiator solution was continuously fed to the reactor at a rate of 50 ml/hour throughout the polymerization reaction. After a total of 9912 g monomer mixture had been fed to the reactor, monomer addition was discontinued and the reactor was purged of residual monomer. The total reaction time was 11.4 hours. The resulting fluoroelastomer dispersion was coagulated by addition of calcium nitrate solution. The fluoroelastomer was decanted and then washed with deionized water. The polymer crumb was dried for two days at 60° C. The product, comprised of 41.6 wt. % TFE units, 41.6 wt. % PMVE units, 7.7 wt. % ethylene, and 1.1 wt. % BTFB units, was an amorphous elastomer having a glass transition temperature of −10° C., as determined by differential scanning calorimetry (heating mode, 10° C./minute, inflection point of transition). Mooney viscosity, ML(1+10), was 124.

What is claimed is:

1. An emulsion polymerization process for producing a fluoroelastomer, said fluoroelastomer having at least 58 eight percent fluorine, comprising:

(A) charging a reactor with a quantity of an aqueous solution comprising a surfactant of the formula CH$_3$—

$(CH_2)_n$—$SO_3M$ where n is an integer from 6 to 17, or mixtures thereof, and M is a cation having a valence of 1;

(B) charging the reactor with a quantity of a monomer mixture to form a reaction medium, said monomer mixture comprising i) from 25 to 70 weight percent, based on total weight of the monomer mixture, of a first monomer, said first monomer selected from the group consisting of vinylidene fluoride and tetrafluoroethylene, and ii) between 75 and 30 weight percent, based on total weight of the monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof; and (C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C.

2. The emulsion polymerization process of claim 1 further comprising (D) isolating fluoroelastomer from said dispersion by addition of a coagulating agent.

3. The emulsion polymerization process of claim 2 wherein said coagulating agent is chosen so as to form a water-soluble salt with the surfactant present in the fluoroelastomer dispersion.

4. The emulsion polymerization process of claim 2 wherein said coagulating agent is a salt having a cation selected from the group consisting of $Al^{3+}$, $Ca^{2+}$, $Mg^{2+}$ and univalent cations.

5. The emulsion polymerization process of claim 4 wherein said coagulating agent is selected from the group consisting of aluminum sulfate and alums.

6. The emulsion polymerization process of claim 4 wherein said coagulating agent is selected from the group consisting of calcium nitrate and magnesium sulfate.

7. The emulsion polymerization process of claim 1 wherein said process is a continuous process.

8. The emulsion polymerization process of claim 1 wherein said process is a semi-batch process.

9. The emulsion polymerization process of claim 1 wherein said aqueous solution in (A) further comprises a nucleating agent.

10. The emulsion polymerization process of claim 1 wherein said surfactant has an n value that is an integer from 7 to 14.

11. The emulsion polymerization process of claim 10 wherein said surfactant is of the formula $CH_3$—$(CH_2)_7SO_3Na$.

12. The emulsion polymerization process of claim 1 wherein said first monomer is vinylidene fluoride.

13. The emulsion polymerization process of claim 1 wherein said first monomer is tetrafluoroethylene.

14. The emulsion polymerization process of claim 1 wherein at least one additional monomer is a fluorine-containing olefin.

15. The emulsion polymerization process of claim 14 wherein said fluorine-containing olefin is selected from the group consisting of vinylidene fluoride; tetrafluoroethylene; hexafluoropropylene; 1,2,3,3,3-pentafluoropropene; and chlorotrifluoroethylene.

16. The emulsion polymerization process of claim 1 wherein at least one additional monomer is a fluorine-containing vinyl ether.

17. The emulsion polymerization process of claim 16 wherein said fluorine-containing vinyl ether is a perfluoro (alkyl vinyl) ether.

18. The emulsion polymerization process of claim 17 wherein said perfluoro(alkyl vinyl) ether is perfluoro(methyl vinyl) ether.

19. The emulsion polymerization process of claim 1 wherein at least one additional monomer is a hydrocarbon olefin selected from the group consisting of propylene and ethylene.

20. The emulsion polymerization process of claim 1 wherein said monomer mixture further comprises 0.05 to 10 weight percent, based on the total weight of monomers, of a cure site monomer.

21. The emulsion polymerization process of claim 20 wherein said cure site monomer is selected from the group consisting of i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene; viii) perfluoro(2-phenoxypropyl vinyl) ether; and nonconjugated dienes.

22. The emulsion polymerization process of claim 1 wherein a chain transfer agent is added to said reaction medium during step (C).

23. The emulsion polymerization process of claim 1 wherein said fluoroelastomer comprises copolymerized units selected from the group consisting of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl) ether, tetrafluoroethylene and 4-bromo-3,3,4,4-tetrafluorobutene-1; vi) vinylidene fluoride, perfluoro(methyl vinyl) ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl) ether and ethylene; ix) tetrafluoroethylene, perfluoro(methyl vinyl) ether, ethylene and 4-bromo-3,3,4,4-tetrafluorobutene-1; x) tetrafluoroethylene, perfluoro(methyl vinyl) ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl) ether; xiii) tetrafluoroethylene, perfluoro(methyl vinyl) ether and perfluoro(8-cyano-5-methyl-3,6-dioxa-1-octene); xiv) tetrafluoroethylene, perfluoro(methyl vinyl) ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl) ether and perfluoro(2-phenoxypropyl vinyl) ether.

24. The emulsion polymerization process of claim 23 wherein said fluoroelastomer further comprises end groups selected from the group consisting of bromine-containing end groups, iodine-containing end groups, and mixtures thereof.

25. An emulsion polymerization process for producing a fluoroelastomer, said fluoroelastomer having at least 58 eight percent fluorine, comprising:

(A) charging a reactor with a quantity of an aqueous solution comprising a surfactant of the formula $CH_3$—$(CH_2)_n$—$C_6H_4$—$SO_3M$, where n is an integer from 6 to 17 or mixtures thereof, and M is a cation having a valence of 1;

(B) charging the reactor with a quantity of a monomer mixture to form a reaction medium, said monomer mixture comprising i) from 25 to 70 weight percent, based on total weight of the monomer mixture, of a first monomer, said first monomer selected from the group consisting of vinylidene fluoride and tetrafluoroethylene, and ii) between 75 and 30 weight percent, based on total weight of the monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof; and (C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C.

26. The emulsion polymerization process of claim 25 further comprising (D) isolating fluoroelastomer from said dispersion by addition of a coagulating agent.

27. The emulsion polymerization process of claim 26 wherein said coagulating agent is chosen so as to form a water-soluble salt with the surfactant present in the fluoroelastomer dispersion.

28. The emulsion polymerization process of claim 26 wherein said coagulating agent is a salt having a cation selected from the group consisting of $Al^{3+}$, $C^{2+}$, $Mg^{2+}$ and univalent cations.

29. The emulsion polymerization process of claim 28 wherein said coagulating agent is selected from the group consisting of aluminum sulfate and alums.

30. The emulsion polymerization process of claim 28 wherein said coagulating agent is selected from the group consisting of calcium nitrate and magnesium sulfate.

31. The emulsion polymerization process of claim 25 wherein said process is a continuous process.

32. The emulsion polymerization process of claim 25 wherein said process is a semi-batch process.

33. The emulsion polymerization process of claim 25 wherein said aqueous solution in (A) further comprises a nucleating agent.

34. The emulsion polymerization process of claim 25 wherein said surfactant is of the formula $CH_3—(CH_2)_{11}—C_6H_4—SO_3Na$.

35. An emulsion polymerization process for producing a fluoroelastomer, said fluoroelastomer having at least fifty eight percent fluorine, comprising:

(A) charging a reactor with a quantity of an aqueous solution comprising a surfactant of the formula $CH_3—(CH_2)_n—CH=CH—CH_2—SO_3M$, where n is an integer from 6 to 17 or mixtures thereof, and M is a cation having a valence of 1;

(B) charging the reactor with a quantity of a monomer mixture to form a reaction medium, said monomer mixture comprising i) from 25 to 70 weight percent, based on total weight of the monomer mixture, of a first monomer, said first monomer selected from the group consisting of vinylidene fluoride and tetrafluoroethylene, and ii) between 75 and 30 weight percent, based on total weight of the monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof; and (C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C.

36. The emulsion polymerization process of claim 35 further comprising (D) isolating fluoroelastomer from said dispersion by addition of a coagulating agent.

37. The emulsion polymerization process of claim 36 wherein said coagulating agent is chosen so as to form a water-soluble salt with the surfactant present in the fluoroelastomer dispersion.

38. The emulsion polymerization process of claim 36 wherein said coagulating agent is a salt having a cation selected from the group consisting of $Al^{3+}$, $Ca^{2+}$, $Mg^{2+}$ and univalent cations.

39. The emulsion polymerization process of claim 38 wherein said coagulating agent is selected from the group consisting of aluminum sulfate and alums.

40. The emulsion polymerization process of claim 38 wherein said coagulating agent is selected from the group consisting of calcium nitrate and magnesium sulfate.

41. The emulsion polymerization process of claim 35 wherein said process is a continuous process.

42. The emulsion polymerization process of claim 35 wherein said process is a semi-batch process.

43. The emulsion polymerization process of claim 35 wherein said aqueous solution in (A) further comprises a nucleating agent.

44. The emulsion polymerization process of claim 35 wherein said surfactant is of the formula $CH_3—(CH_2)_8—CH=CH—CH_2—SO_3Na$.

* * * * *